US011516636B2

(12) United States Patent
Yu et al.

(10) Patent No.: US 11,516,636 B2
(45) Date of Patent: Nov. 29, 2022

(54) LATENCY MASKING IN AN AUTONOMOUS VEHICLE USING EDGE NETWORK COMPUTING RESOURCES

(71) Applicant: GM GLOBAL TECHNOLOGY OPERATIONS LLC, Detroit, MI (US)

(72) Inventors: Bo Yu, Troy, MI (US); Can Carlak, Ann Arbor, MI (US); Jimmy Qi, Shanghai (CN); Shuqing Zeng, Sterling Heights, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 17/162,452

(22) Filed: Jan. 29, 2021

(65) Prior Publication Data
US 2022/0248194 A1 Aug. 4, 2022

(51) Int. Cl.
*H04W 4/40* (2018.01)
*G05D 1/02* (2020.01)
*H04W 24/02* (2009.01)
*H04W 84/18* (2009.01)
*G05D 1/00* (2006.01)

(52) U.S. Cl.
CPC ............ *H04W 4/40* (2018.02); *G05D 1/0088* (2013.01); *G05D 1/0276* (2013.01); *H04W 24/02* (2013.01); *H04W 84/18* (2013.01)

(58) Field of Classification Search
None
See application file for complete search history.

(56) References Cited

U.S. PATENT DOCUMENTS 10,966,069 B1 * 3/2021 Liu ........................ H04W 4/027

* cited by examiner

*Primary Examiner* — Adolf Dsouza

(57) ABSTRACT

A latency masking system for use in an autonomous vehicle (AV) system includes a sensors module providing sensor data from a plurality of sensors. The sensor data includes image frames provided by a vehicle camera and vehicle motion data. A wireless transceiver transmits the sensor data to a remote server associated with a network infrastructure and receives remote state information derived from the sensor data. An on-board function module receives the sensor data from the sensors module and generates local state information. A state fusion and prediction module receives the remote station information and the local state information and updates the local state information with the remote state information. The state fusion and prediction module uses checkpoints in a state history data structure to update the local state information with the remote state information.

20 Claims, 13 Drawing Sheets

LATENCY MASKING IN AN AUTONOMOUS VEHICLE USING EDGE NETWORK COMPUTING RESOURCES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Cloud computing provides computing and storage services from a centralized location in a communication network. Cloud computing is suitable for applications that are not time-sensitive. Edge computing provides computing and storage services for applications that operate in real-time or nearly real-time. Edge computing pushes computing to the edge of both wireline and wireless networks to support real-time mission critical applications. By way of example, an edge computing architecture may deploy data centers proximate cellular towers or at regional levels, rather than remotely in the cloud.

However, the network latency between a vehicle and an edge computing architecture may still make the results from the edge network resources invalid for some mission critical vehicle functions, such as autonomous driving perception functions. The typical round trip time latency of an LTE network may be in the range of 70-90 milliseconds for short ping messages and even longer for larger packets.

The present disclosure relates to vehicles that use wireless edge networks and cloud networks to enhance vehicle functions and to a system and method of mitigating or masking the impact of network latency when offloading to a wireless network selected functions associated with real-time automotive applications.

SUMMARY

It is an object of the present disclosure to provide a latency masking system configured for use in an autonomous vehicle (AV) system. The latency masking system comprises: i) a sensors module configured to provide sensor data from a plurality of sensors in the AV system, the sensor data including image frames provided by at least one vehicle camera and vehicle motion data; ii) a wireless transceiver module configured to transmit the sensor data to a remote server associated with a network infrastructure and to receive from the remote server remote state information derived from the sensor data; and iii) an on-board function module configured to receive the sensor data from the sensors module and to generate therefrom local state information.

The latency masking system further comprises iv) a state fusion and prediction module configured to receive the remote station information and the local state information and to update the local state information with the remote state information; and v) a state history data structure associated with the state fusion and prediction module, wherein the state fusion and prediction module uses checkpoints in the state history data structure to update the local state information with the remote state information.

In one embodiment, the remote server is an edge server located proximate a wireless access point of the network infrastructure with which the wireless transceiver module communicates.

In another embodiment, the remote server is a cloud server accessed through an IP network by a wireless access point of the network infrastructure with which the wireless transceiver module communicates.

In still another embodiment, the state fusion and prediction module uses a first checkpoint in the state history data structure to identify earlier-processed local state information associated with the first checkpoint that corresponds to later-received remote state information.

In yet another embodiment, the state fusion and prediction module updates the earlier-processed local state information with the later-received remote state information to compensate for latency associated with transmitting the sensor data to the remote server and receiving the remote state information derived from the sensor data.

In a further embodiment, the state fusion and prediction module is further configured to update second earlier-processed local state information associated with a second checkpoint with the later-received remote state information.

In a still further embodiment, the on-board function module is further configured to create the first checkpoint by storing in the state history data structure first state data associated with a first image frame and a first time tag associated with the first image frame.

In a yet further embodiment, the state fusion and prediction module uses a second time tag associated with the later-received remote state information to associate the first state data with the later-received remote state information.

In one embodiment, the AV system uses the updated local state information to perform path planning and vehicle control.

It is another object of the present disclosure to provide a method for compensating for latency in an autonomous vehicle (AV) system. The method comprises: i) providing in a sensors module sensor data from a plurality of sensors in the AV system, the sensor data including image frames provided by at least one vehicle camera and vehicle motion data; ii) transmitting the sensor data to a remote server associated with a network infrastructure; and iii) receiving from the remote server remote state information derived from the sensor data.

The method further comprises: iv) receiving in an on-board function module the sensor data from the sensors module and generating therefrom local state information; and v) receiving in a state fusion and prediction module the remote station information and the local state information and updating the local state information with the remote state information.

In one embodiment, a state history data structure is associated with the state fusion and prediction module.

In another embodiment, updating the local state information with the remote state information comprises using checkpoints in the state history data structure to update the local state information with the remote state information.

In yet another embodiment, the method further comprises using a first checkpoint in the state history data structure to identify earlier-processed local state information associated with the first checkpoint that corresponds to later-received remote state information.

In still another embodiment, updating the earlier-processed local state information with the later-received remote state information compensates for latency associated with transmitting the sensor data to the remote server and receiving the remote state information derived from the sensor data.

In a further embodiment, the method further comprises updating second earlier-processed local state information associated with a second checkpoint with the later-received remote state information.

In a yet further embodiment, the method further comprises creating the first checkpoint by storing in the state history data structure first state data associated with a first image frame and a first time tag associated with the first image frame.

In a still further embodiment, the method further comprises using a second time tag associated with the later-received remote state information to associate the first state data with the later-received remote state information.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes a system architecture and related methods that leverage resources, such as computing and storage, on an edge or cloud network to enhance vehicle on-board functions. The disclosed methods and processing algorithms mitigate and/or mask the impact of network latency to mission critical automotive applications and include state history data structure(s), state rollback methods, state prediction methods, state fusion, and the like. According to the principles of the present disclosure, the disclosed systems and methods mask the impact of latency by preventing the AV system from knowing that latency exists in the first place by using careful pre-emptive system design. Offloading vehicle functions is particularly useful in autonomous vehicle (AV) applications because the offloading helps satisfy increasing demand of AVs for computing resources without increasing the vehicle on-board hardware cost. Moreover, multiple vehicles may share the resources on an edge or cloud network architecture thereby reducing the cost per vehicle.

Figure 1:
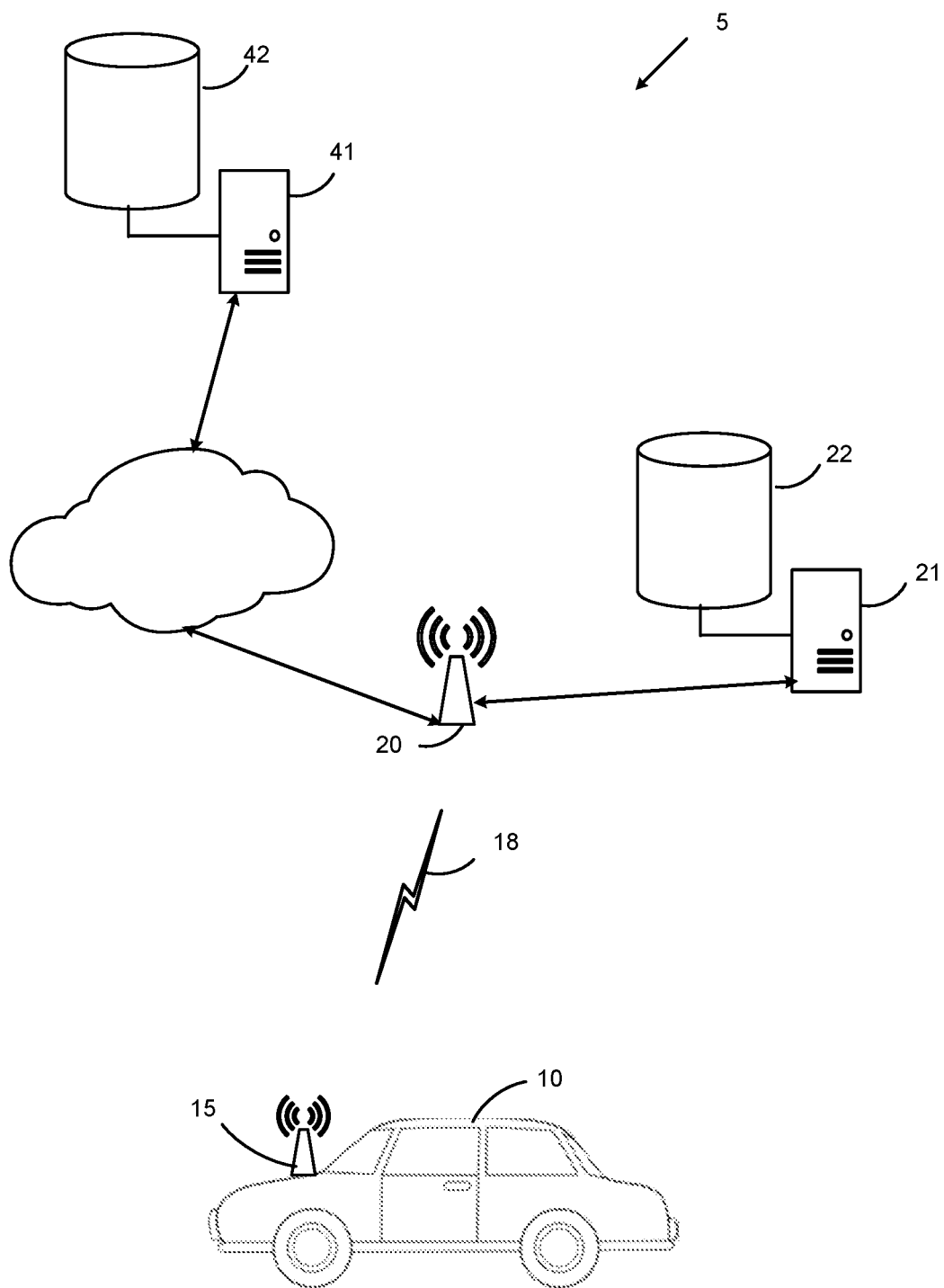
FIG. 1 is an overview of a network topology for mitigating the impact of network latency in supporting critical functions in a vehicle system according to an embodiment of the present disclosure.

FIG. 1 is an overview of a network topology 5 for mitigating the impact of network latency in supporting critical functions in a vehicle system 10 according to an embodiment of the present disclosure. The network topology 5 comprises a plurality of cloud network resources, including exemplary cloud server 41 and cloud database (DB) 42, and a plurality of edge network resources, including exemplary edge server 21 and edge database 22. A plurality of vehicle systems, including exemplary vehicle system 10, communicate with the cloud server 41 via an internet protocol (IP) network 30, which may include a wireless access point 20 at the edge of the IP network 30. The vehicle systems 10 also communicate with an edge server 21, which may be co-located with the wireless access point 20 at the edge of the IP network 30.

Each of the vehicle systems 10 includes a wireless access point (AP) 15 that enables the vehicle system 10 to communicate via a wireless link 18 with the cloud server 41 and/or the edge server 12. In a typical scenario, the wireless access point 20 is a base station of a cellular network and the wireless access point 15 in the vehicle system 10 is a cellular mobile transceiver. According to the principles of the present disclosure, the vehicle system 10 may offload one or more vehicle functions to either the edger server 21 or the cloud serve 41. This is particularly advantageous if the vehicle system 10 is an autonomous vehicle (AV). In this way, multiple vehicle systems 10 may share the processing resources, memory resources, and storage capabilities of an edge or cloud network architecture.

Figure 2:
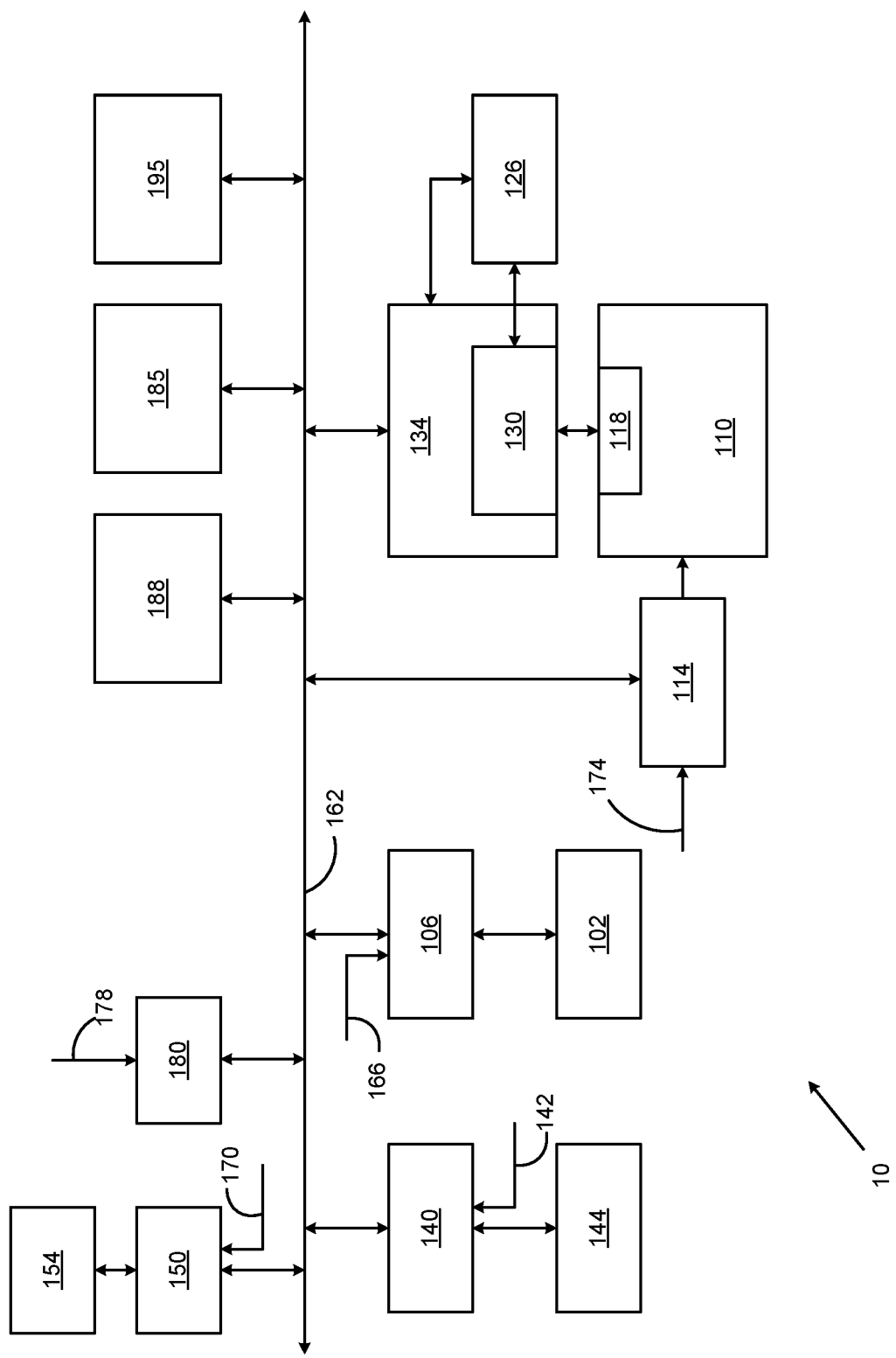
FIG. 2 is a functional block diagram of an exemplary vehicle system that includes a latency masking system according to an embodiment of the present disclosure.

FIG. 2 is a functional block diagram of an exemplary vehicle system 10 that includes a latency masking system according to the principles of the present disclosure. While the present disclosure shows and describes a vehicle system 10 that is a hybrid vehicle having a driver, the present disclosure is also applicable to non-hybrid vehicles incorporating only an internal combustion engine and to driverless autonomous vehicles (AVs). While the present disclosure uses a vehicle as an exemplary embodiment, the present disclosure is also applicable to non-automobile implementations, such as boats and aircraft.

An engine 102 combusts an air/fuel mixture to generate drive torque. An engine control module (ECM) 106 controls the engine 102 based on one or more driver inputs. For example, the ECM 106 may control actuation of engine actuators, such as an electronically controlled throttle valve, one or more spark plugs, one or more fuel injectors, valve actuators, camshaft phasers, an exhaust gas recirculation (EGR) valve, one or more intake airflow boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 10 may include one or more electric motors. For example, an electric motor 118 may be implemented within the transmission 110 as shown in the example of FIG. 1A. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 10 further comprises an advanced computing module 185, a sensors module 188, and a wireless transceiver (XCVR) module 195. In FIG. 2, the wireless transceiver module 195 corresponds to the wireless access point 15 in FIG. 1. The sensors module 188 may include a plurality of sensors that support, for example, basic cruise control, full speed range adaptive cruise control, and/or semi-autonomous or true autonomous driving. These sensors may include, but are not limited to, an on-board GPS receiver, a plurality of radar detectors and a plurality of cameras that detect objects (e.g., other vehicles) proximate the vehicle system 10, a light detection and ranging (LiDAR) system, a wheel speed sensors, a steering wheel angle (SWA) sensor, a plurality of accelerometers, and the like.

The sensors in sensors module 188 may be used to detect numerous driver events. The radar detectors and cameras, for example, may determine following distance (i.e., potential tailgating). The cameras may detect lane markers and determine whether and how often the vehicle system 10 changes lanes, drifts across the center of the road into oncoming traffic, drifts onto the shoulder of the road, lane-centering performance and the like. The accelerometers may detect sudden accelerations, sudden decelerations (i.e., braking), and sudden or exaggerated lateral movements, indicating swerving or sharp turns.

The advanced computing module 185 comprises a high performance computing platform that controls many of the higher order functions and lower order functions of the vehicle system 10. In a typical implementation, the advanced computing module 185 may be implemented as a microprocessor and an associated memory. The advanced computing module 185 executes a kernel program that controls the overall operation of the advanced computing module 185.

According to the principles of the present disclosure, the advanced computing module 185 consumes information from the sensors module 188 (e.g., wheel speed data, steering wheel angle sensor data, brake status data, LiDAR system data, radar data, camera images, GPS data, accelerometer data, etc.) to determine the speed, direction, and location of the vehicle system 10. The advanced computing module 185 uses the consumed information to send commands to, for example, the steering control module 140, the engine control module 106, and the electronic brake control module 150, to control the speed, braking, and/or direction of the vehicle system 10. The advanced computing module 185 is also responsible for communicating with the cloud server 41 and the edge server 21 via the wireless transceiver module 195.

Figure 3:
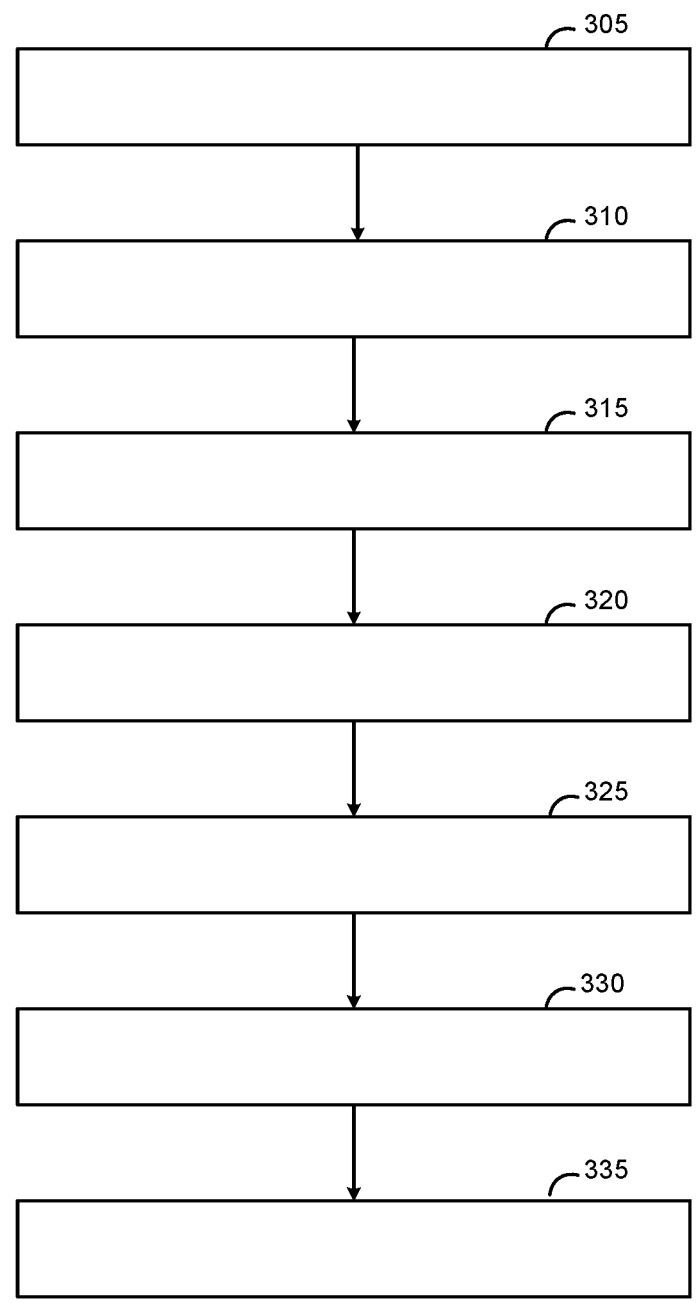
FIG. 3 is a flow diagram illustrating the operation of the exemplary latency masking system according to an embodiment of the present disclosure.

FIG. 3 is a flow diagram illustrating the operation of the exemplary latency masking system according to an embodiment of the present disclosure. In 305, the vehicle system 10 collects vehicle sensor data, including GPS, camera images, LiDAR data, radar data, speed, yaw, and the like. In 310, the vehicle system 10 compresses and streams the vehicle sensor data to the edge server 21.

In 315, the edge server 21 decompresses the sensor data. In 320, the edge server 21 processes the sensor data with cloud and/or edge resources (CPU, GPU, storage) in real-time. In 325, the edge server 21 sends the cloud/edge results back to the vehicle system 10. In 330, the vehicle system 10 fuses the cloud/edge results with the vehicle on-board results. In 335, the vehicle system 10 sends the fused results to the corresponding AV subsystems, such as path planning, and vehicle control.

Figure 4:
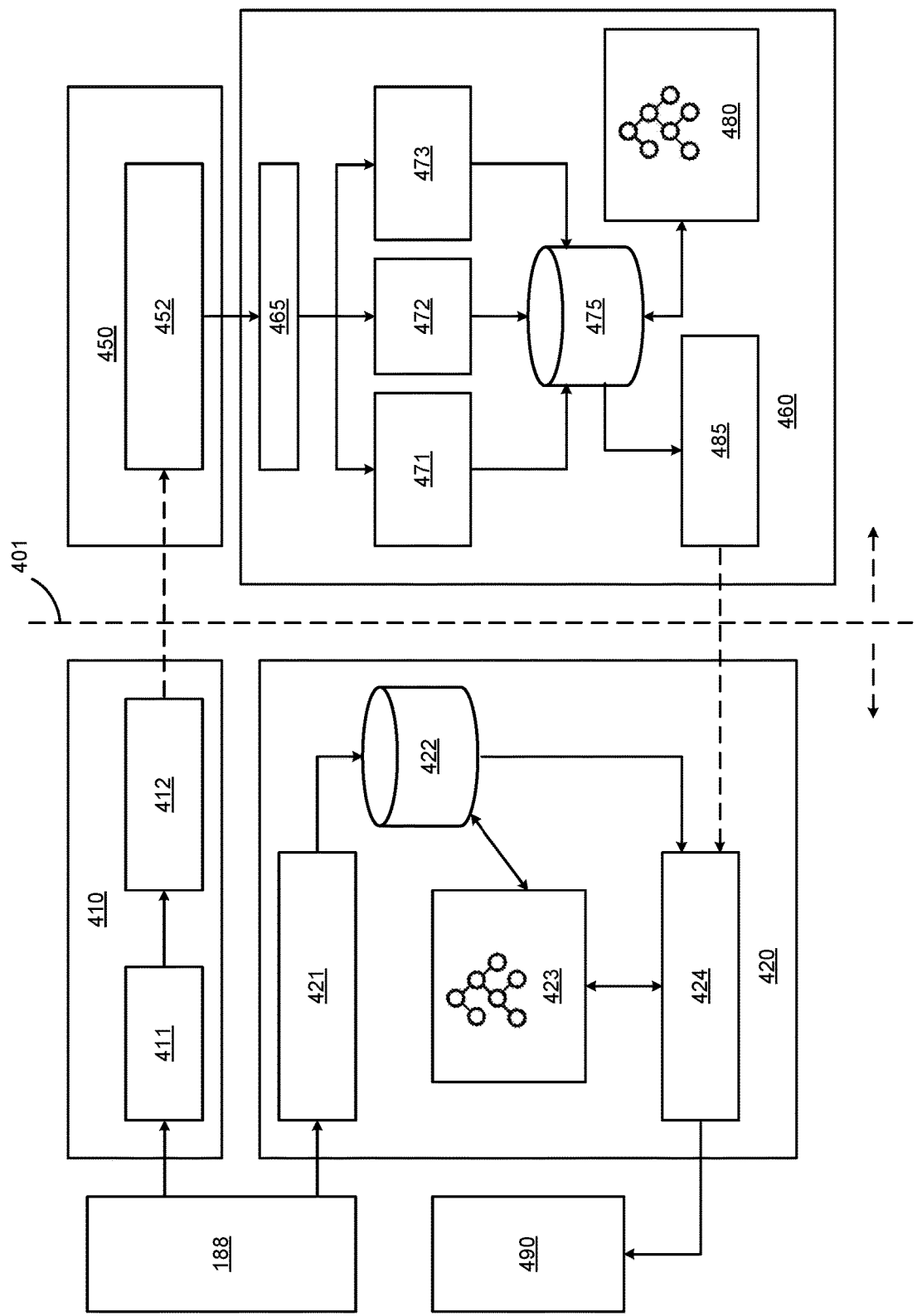
FIG. 4 is a block diagram of the exemplary latency masking system according to an embodiment of the present disclosure.

FIG. 4 is a block diagram of the exemplary latency masking system according to an embodiment of the present disclosure. In FIG. 4, elements to the left side of dotted line 401 are located in the vehicle system 10 and elements to the right side of dotted line 401 are located in the edge/cloud architecture, typically in edge server 21. According to an exemplary embodiment of the disclosure, most of the components in the vehicle system 10 in FIG. 4, such as the sensor steaming module 410, the hybrid vehicle function module 420, and the path planning and vehicle control module 490, are functional blocks that are executed by the advanced computing module 185. Furthermore, most of the components in the cloud/edge network in FIG. 4, such as the sensor-streaming module 450 and the enhanced edge function module 460 are functional blocks that are executed by the edge server 21.

The sensor-streaming module 410 receives sensor data from the sensors module 188. The sensor data may typically include a large amount of video data from the cameras in the vehicle system 10, as well as LiDAR data, and radar data. The adaptive streaming module 411 adjusts sensor data sampling policies, such as, sample resolution and sample frequency, to reduce bandwidth usage. The sensor data compression module 412 uses a video compression algorithm, such as H.264 or H.265, to compress the encoded sensor data prior to transmission via the wireless transmission link 18.

In the edge/cloud architecture, sensor-streaming module 450 receives the transmitted sensor data from the transmission link 18. The sensor data decompression module 452 decompresses the transmitted sensor data using the same algorithm (e.g., H.264 or H.265) that was used in the sensor data compression module 412. The decompressed data is then transferred to the enhanced edge function module 460, which may be executed by edge server 21, for example.

A sensor data multiplexer (MUX) 465 receives the decompressed sensor data and directs the sensor data to a plurality of functional blocks in the enhanced edge function module 460. For example, a first functional block (F1) may comprise an object detection and tracking module 471, which may identify pedestrians, obstacles, and other vehicles in the video data. A second exemplary functional block (F2) may comprises a lane detection module 472, which detects the lane markings or other road boundaries in the video data. A third exemplary functional block (F3) may comprise a mapping and positioning module 473, which determines the position of the vehicle system 10 and simultaneously creates a digital map for the vehicle system 10 to follow.

The outputs of the exemplary functional blocks (e.g., F1, F2, F3) may be used to create a "world state" associated with the vehicle system 10. The world state may be stored in a world state database module 475, which includes a state history data structure module 480 that is continuously updated with new world state information as sensor data continues to be received from the vehicle system 10.

The path planning and vehicle control module 490 may subsequently use the world state information. However, due to the round trip delay in sending the sensor data to the edge/cloud infrastructure, processing the sensor data, and transmitting results back to the vehicle system 10, there is significant latency in the transmitted results that the path planning and vehicle control module receives. Therefore, the edge enhanced function module 460 further comprises a state prediction and latency compensation module 485 that compensates for the latency and sends back a predicted state associated with the world state information, as explained below in greater detail.

In the hybrid vehicle function module 420, an on-board function module 421 receives the sensor data from the sensors module 188. The sensor data is the same sensor data that is encoded, compressed, and transmitted by the sensor-steaming module 410 to the sensor-streaming module 450. In an exemplary embodiment, the on-board function module 421 processes "perception" data, such as video data from the cameras, as well as LiDAR data and radar data, and other data relevant to perceiving the physical environment around the vehicle system 10. By way of example, the on-board function module 421 comprises a local processing pipeline that replicates the functions F1, F2, and F3 executed in the edge/cloud processing pipeline by the enhanced edge function module 460.

As a result, the on-board function module 421 produces local world state information that corresponds to the remote world state information produced by the enhanced edge function module 460. The on-board function module 421 stores the local world state information in world state database module 422, which includes a state history data structure module 423 that is continuously updated with new local world state information as sensor data continues to be received from the sensors module 188.

The hybrid vehicle function module 420 further includes state fusion and prediction module 424, which receives both the local world state information from world state database module 422 and the edge (or remote) world state information from the state prediction and latency compensation module 485. According to an exemplary embodiment of the present disclosure, the sensor data from sensors module 188 is tagged with a time stamp when the sensor data is sent to the sensor streaming module 410 and the on-board function module 421. The time stamps synchronize the remote world state information in state history data structure module 480 with the local world state information in state history data structure module 423. This enables the state fusion and prediction module 424 to fuse together the world station information and send an updated world state information to the path planning and vehicle control module 490. The path planning and vehicle control module 490 is responsible for determining a path that avoids pedestrians, vehicles and obstacles near the vehicle system 10 and then controls the steering, braking and acceleration of the vehicle system 10 to traverse the determined path.

Figure 5:
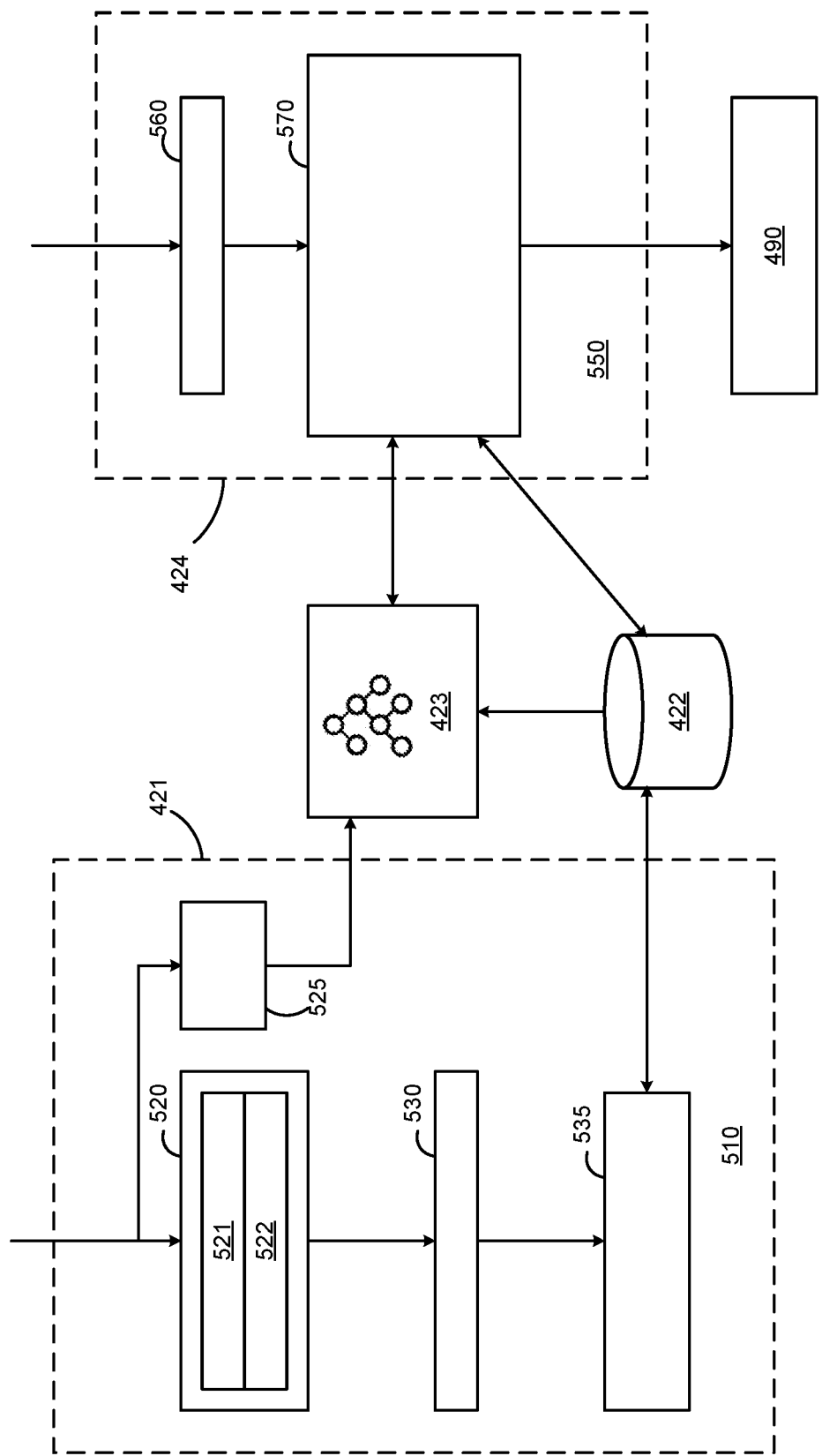
FIG. 5 is a block diagram of selected components of the exemplary latency masking system according to an embodiment of the present disclosure.

FIG. 5 is a block diagram of selected components of the exemplary latency masking system in FIG. 4 according to an embodiment of the present disclosure. In FIG. 5, the on-board function module 421 receives vehicle sensor data and the state fusion and prediction module 424 receives vehicle edge results from the edge server 21. The on-board function module 421 and the state fusion and prediction module 424 both access state information in the world state database module 422 and the state history data structure module 423.

The on-board function module 421 comprises a conventional autonomous vehicle (AV) perception protocol stack module 510 that processes perception data (e.g., video, LiDAR, radar data) relevant to the physical environment around the vehicle system 10. The AV perception protocol stack module 510 comprises a camera frames module 520, which includes an object detection module 521 and an object tracking module 522, and a 3D conversion module 530. The object detection module 521 and the object-tracking module 522 detect and track objects in the camera frame data. The 2D objects in the image data are then converted to 3D objects by the 3D conversion module 530.

The AV perception protocol stack module 510 further comprises a vehicle motion model module 525 and an update world state module 535. The vehicle motion model module 525 integrates the vehicles GPS data, speed, yaw rate, and the like into the state history data structure module 423. The data stored in the state history data structure module 423 is indexed using time stamps associated with the vehicle sensor data.

The state fusion and prediction module 424 comprises a hybrid function protocol stack module 550 that includes a 3D conversion module 560 and an update world state module 570. The update world state module 570 processes the perception data in the vehicle edge results, which suffers the latency effects of round trip time (RTT). The update world state module 570 uses the time stamps in the vehicle edge results to: i) find and update the correct checkpoint data in the state history data structure module 423; ii) use the history sensor data to infer the current state; and iii) update the current world state information in the state history data structure module 423 by propagating the changes to the updated checkpoint data. The updated world state information is then transferred to the path planning and vehicle control module 490.

Figure 6:
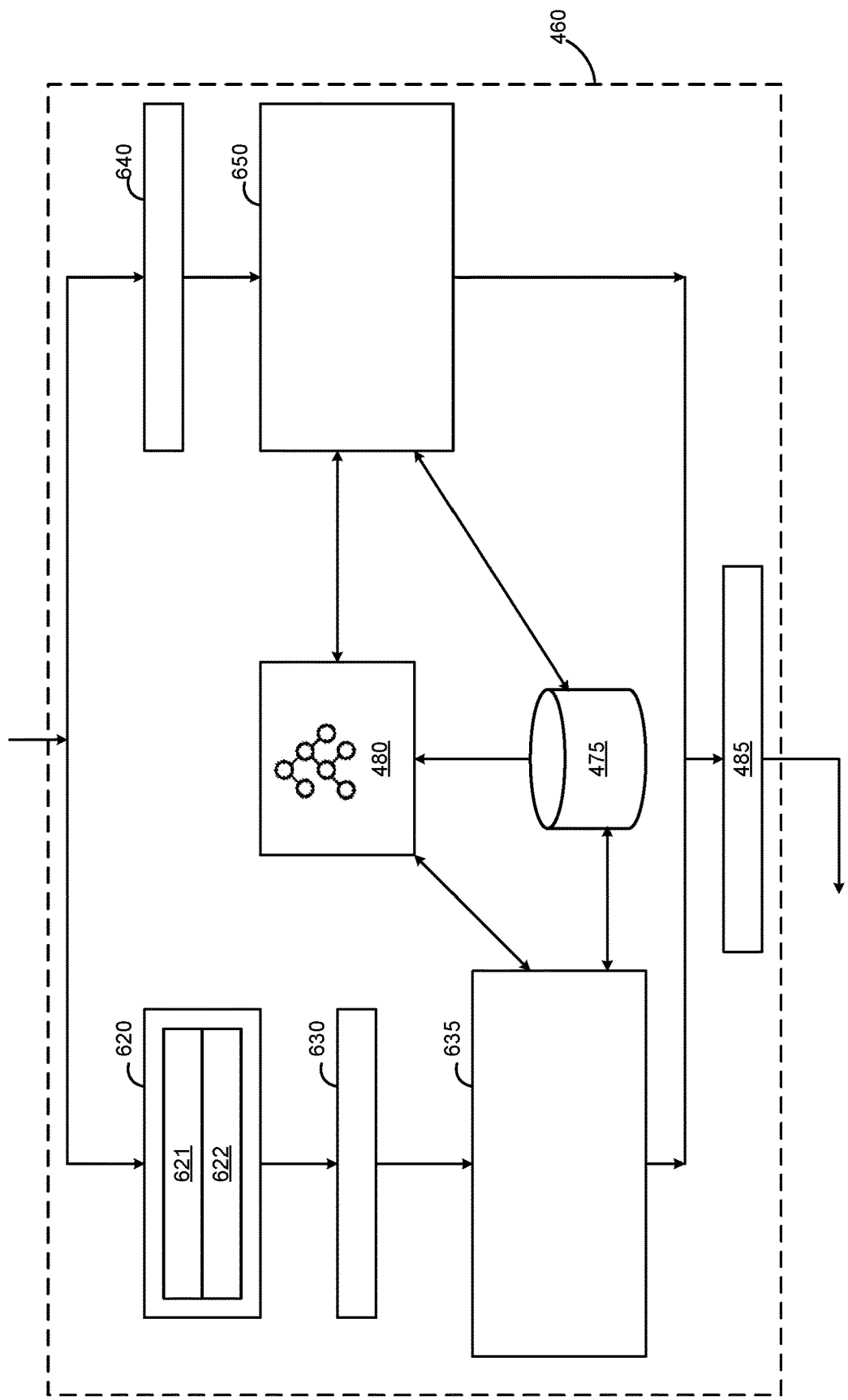
FIG. 6 is a block diagram of the enhanced edge function module in the exemplary latency masking system according to an embodiment of the present disclosure.

FIG. 6 is a block diagram of the enhanced edge function module 460 in the exemplary latency masking system according to an embodiment of the present disclosure. The functional blocks in the enhanced edge function module 460 are analogous to the functional blocks the performed perception processing in the on-board function module 421 in FIG. 4. The enhanced edge function module 460 comprises a camera frames module 620, which includes an object detection module 621 and an object-tracking module 622. The enhanced edge function module 460 further comprises a 3D conversion module 630, and an update world state module 635, an update vehicle motion model module 640, and an update world state module 650.

The updated vehicle motion model module 640 processes the vehicle GPS data, speed, yaw rate, and the like. The data stored in the state history data structure module 480 is indexed using time stamps associated with the vehicle sensor data. The update vehicle motion model module 640 integrates the motion sensor data into the state history data structure module 480 by: i) finding a checkpoint and collecting sensor updates in the history data structure; ii) using history data to infer or predict the current state; and iii) update the current world state information in the state history data structure module 480.

The object detection module 621 and the object-tracking module 622 detect and track objects in the camera frame data. The 3D conversion module 630 converts 2D objects in the image data to 3D objects. The 3D object data is then transferred to the update world state module 635. The update world state module 635 integrates the 3D image data into the state history data structure module 480 by: i) finding a checkpoint and collecting sensor updates in the history data structure; ii) using history data to infer or predict the current state; and iii) update the current world state information in the state history data structure module 480.

The updated vehicle motion data and the updated image data are transferred to the state prediction and latency compensation module 485. The state prediction and latency compensation module 485 is aware of the RTT latency and may offset the updated vehicle motion data and the updated image data to compensate for the latency. For example, if the RTT latency is 300 milliseconds, the state prediction and latency compensation module 485 may predict the position of the vehicle has moved 10 meters to compensate for the latency.

Figure 7:
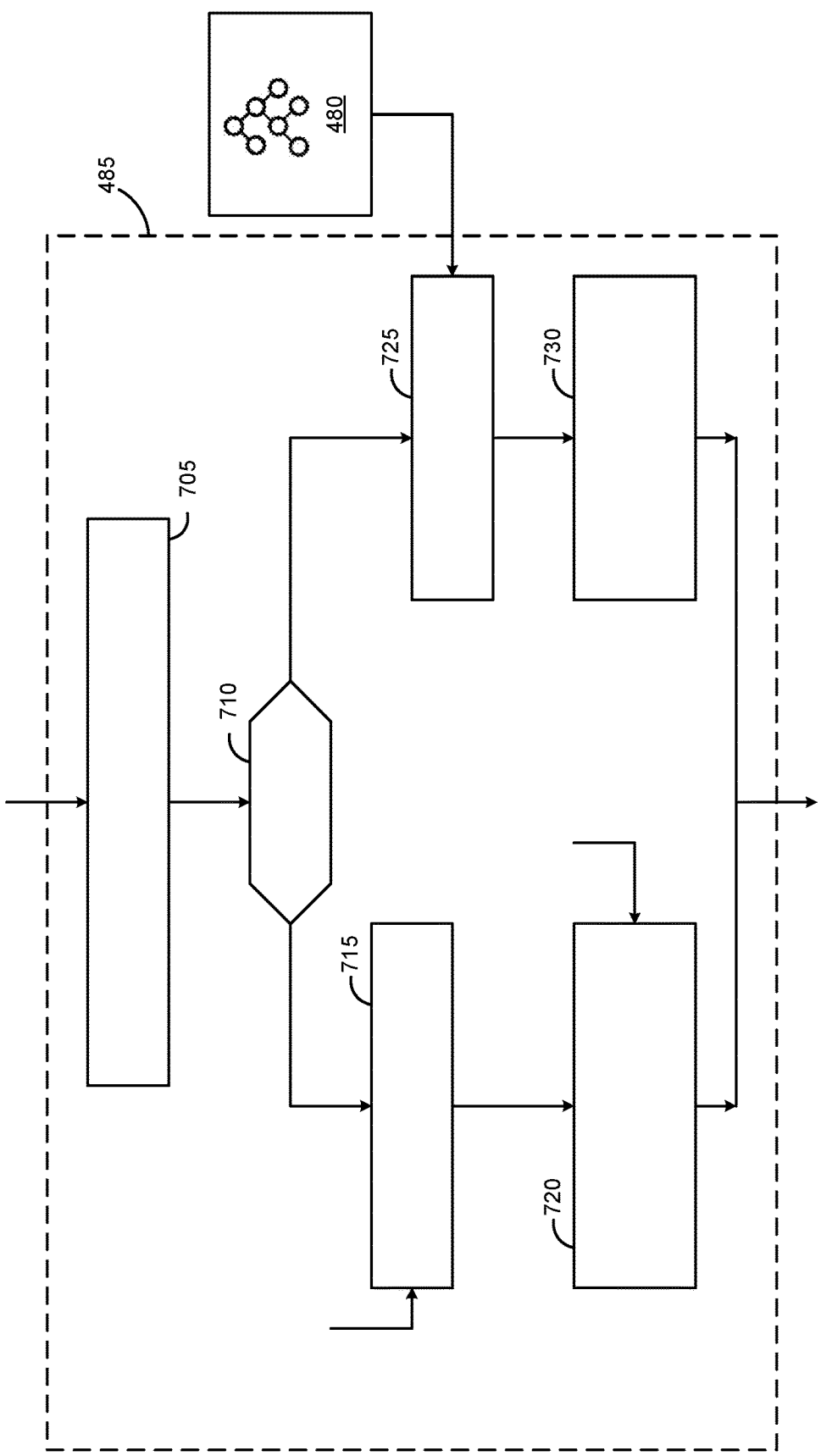
FIG. 7 is a flow diagram illustrating the operation of the state prediction and latency compensation module in the exemplary latency masking system according to an embodiment of the present disclosure.
Figure 8:
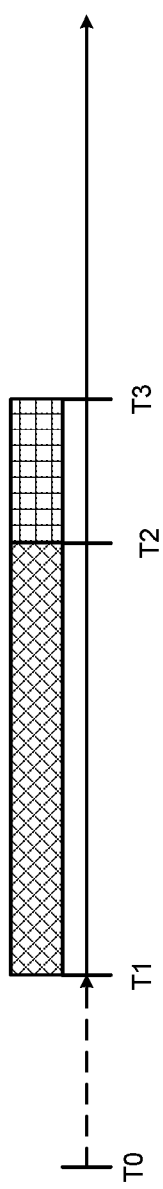
FIG. 8 is a timing diagram illustrating the operation of the state prediction and latency compensation module in the exemplary latency masking system according to an embodiment of the present disclosure.

FIG. 7 is a flow diagram illustrating the operation of the state prediction and latency compensation module 485 in the exemplary latency masking system according to an embodiment of the present disclosure. FIG. 8 is a timing diagram illustrating the operation of the state prediction and latency compensation module 485 in the exemplary latency masking system according to an embodiment of the present disclosure. In FIG. 8, T0 is the timestamp of generated sensor data in the vehicle system 10. T1 is the timestamp of the received sensor data on edge server 21. T2 is the current time on the edge server 21. Finally, T3 is the estimated state prediction completion time.

In 705, the state prediction and latency compensation module 485 determines the value of $\Delta t$ as the difference between the current time T2 and the edge perception processing start time T1. In 710, the state prediction and latency compensation module 485 determines if the value of $\Delta t$ exceeds a predetermined threshold value.

If NO in 710 (the normal case), then in 715 the state prediction and latency compensation module 485 uses a list of latency history $\{\Delta T\}$, where latency $\Delta T=T1-T0$, to calculate an estimated latency: $\Delta T^*$ over the air (confidence+Gaussian Noise). In 720, the state prediction and latency compensation module 485 then calculates a state prediction based on Bayesian or LSTM model (look ahead $\Delta T^*+T3-T1$).

If YES in 710, then there is a low confidence of correction state from the edge server 21. The state prediction and latency compensation module 485 then searches the closest state in the history data structure 480 around the time T1. In 720, if the search fails, the state prediction and latency compensation module 485 does not send data to the vehicle system 10. If the search is successful, the state prediction and latency compensation module 485 sends the searched result to the vehicle system 10.

Figure 9:
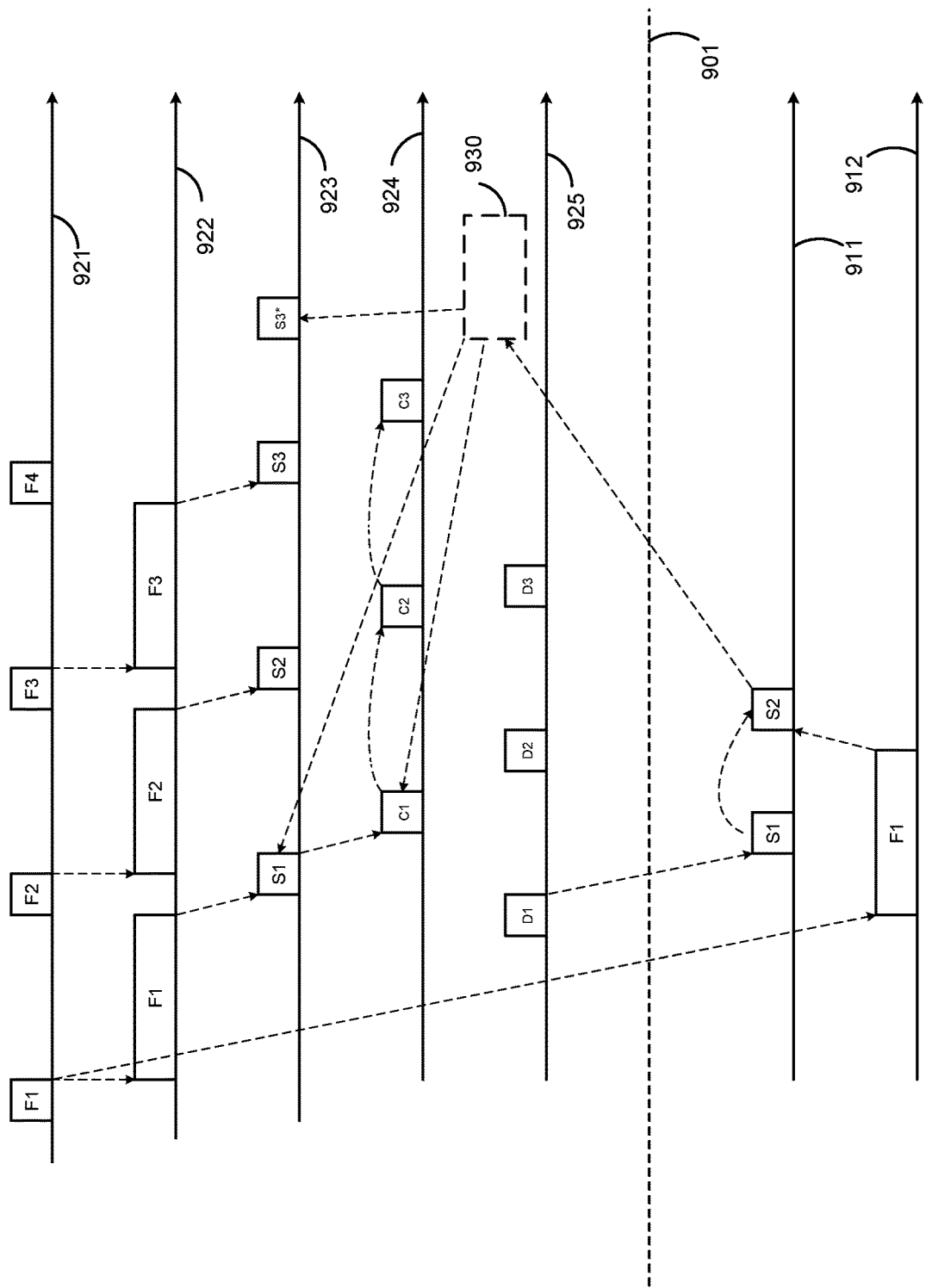
FIG. 9 is a timing diagram illustrating the operation of the exemplary latency masking system according to an embodiment of the present disclosure.

FIG. 9 is a timing diagram illustrating the operation of the exemplary latency masking system according to an embodiment of the present disclosure. In FIG. 9, the dotted line 901 separates the processing on the edge server 21 (below line 901) and the processing in the vehicle system 10 (above line 901). FIG. 9 depicts the processing of data packets in time lines 911 and 912 in edge server 21 and the processing of data packets in time lines 921-925 in the vehicle system 10.

Four exemplary receiving time periods F1, F2, F3, and F4 on time line 921 represent the receipt of four frames (F1-F4) of image data from vehicle cameras. Time line 922 comprises three processing time periods F1, F2, and F3 during which local perception processing occurs for the frames F1, F2, and F3 respectively. The processing time period F1 on time line 922 starts when the receiving time period F1 on time line 921 ends and ends just prior to the start of the receiving time period F2. At the end of the time period F1, the processed frame F1 data updates the local world state information in time period S1 on time line 923.

Similarly, the processing time period F2 starts when the receiving time period F2 ends and ends just prior to the start of the receiving time period F3. At the end of the processing time period F2, the processed frame F2 data updates the local world state information in time period S2 on time line 923.

Finally, the processing time period F3 starts when the receiving time period F3 ends and ends just prior to the start of the receiving time period F4. At the end of the processing time period F3, the processed frame F3 data updates the local world state information in time period S3 on time line 923.

Three exemplary data packets D1, D2, and D3 are processed in processing time periods D1, D2, and D3, respectively, on time line 925. The data packets D1-D3 comprise packets of vehicle motion sensor data (e.g., GPS, yaw, speed). The sensor data packets D1, D2 and D3 are quite small compared to the image frames F1-F4. For this reason, the processing time periods D1-D3 on time line 925 are much shorter than the processing time periods F1-F3 on time line 922.

At the end of each receiving time period F1-F3 on time line 921, the received frames F1-F3 are also transmitted to the edge server 21 and are processed on the time line 912, which represents edge perception processing in the edge server 21. It is noted that due to the transmission delays (i.e. latency), the processing time period F1 on time line 912 during which the image frame F1 is processed does not start until well after the processing time period F1 on time line 922 has begun.

Similarly, the sensor data packets D1-D3 are transmitted to the edge server 21 and processed as explained above in FIGS. 4, 6, and 7. Because the data packets D1-D3 are small, the world state information on timeline 911 may be updated by the data packets before the image frames are finished processing. By way of example, data packet D1 is processed in time period D1 on time line 925 and updates the world state information in the edge server 21 during time period 51 on the time line 911. However, the image frame F1 is processed during the time period F1 on time line 912 and is not ready to update the world state information until time period S2 on time line 911.

According to the principles of the present disclosure, the state prediction and latency compensation module 485 generates a cloud correction data packet 930 that is transmitted back to the vehicle system 10. The state fusion and prediction module 424 uses the cloud correction data packet 930 and the checkpoints C1, C2 and C3 in the state history data structure 423 to rollback and correct the state information 51, S2, and S3 in time periods S1-S3 on time line 923. The final update state information S3* in time period S3* comprises the corrected state information.

FIGS. 10A-10D are state diagrams illustrating the operation of local perception processing in the exemplary latency masking system according to an embodiment of the present disclosure. FIGS. 10A-10D illustrate the creation and updating of checkpoints in the state history data structure 423 as local world state information and edge world state information is received.

Figure 10D:
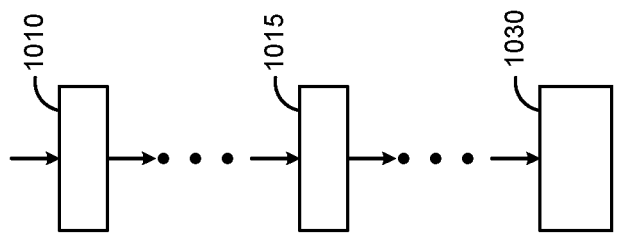
FIGS. 10A-10D are state diagrams illustrating the operation of the exemplary latency masking system according to an embodiment of the present disclosure.
Figure 10C:
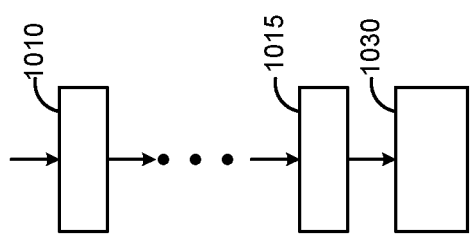
Figure 10B:
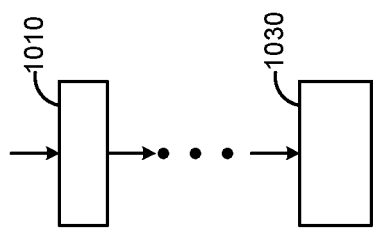
Figure 10A:
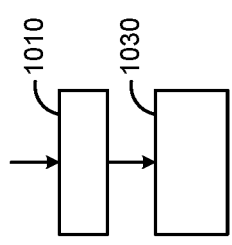

In FIG. 10A, at time t0.0, a first image frame is perception processed locally in hybrid vehicle function module 420 and creates a first checkpoint 1010, labeled CP_0. The checkpoint CP_0 represents the current state 1030. Next, at time t0.5, car area network (CAN) data (e.g., yaw, GPS, speed) is perception processed locally and updates the current state 1030 based on the first checkpoint CP_0.

At time t1.0, a second image frame is perception processed locally in hybrid vehicle function module 420 and creates a second checkpoint 1015, labeled CP_1 (As). The Δs represents new state information associated with the second image frame. The checkpoint CP_1 now represents the current state 1030. Next, at time t1.5, second car area network (CAN) data is perception processed locally and updates the current state 1030 based on the second checkpoint CP_1.

Figure 11:
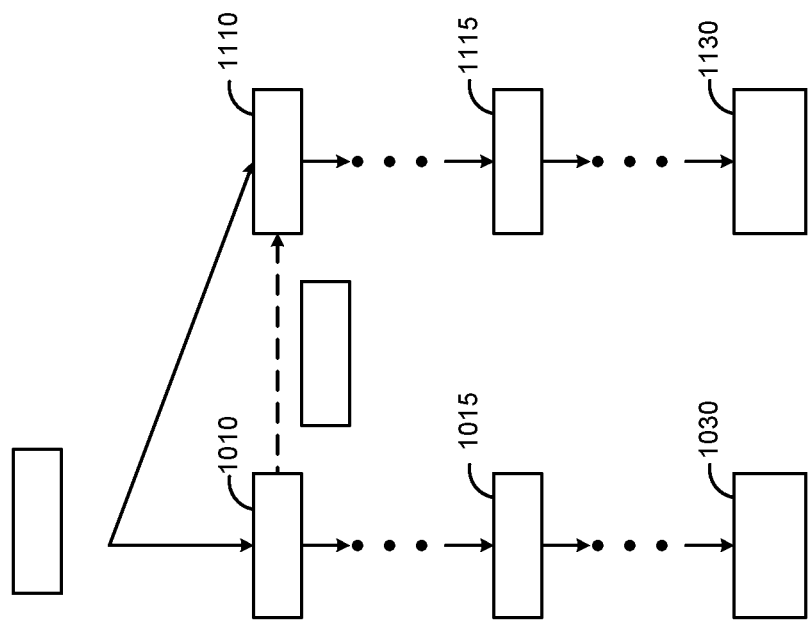
FIG. 11 is a state diagram illustrating the operation of the exemplary latency masking system according to an embodiment of the present disclosure.

FIG. 11 is a state diagram illustrating the operation of cloud results perception processing in the exemplary latency masking system according to an embodiment of the present disclosure. At time t1.5, first cloud results (Cloud_0) are received from the edge server 21. However, due to latency delays, the Cloud_0 results correspond to the first image frame that was received at time t0.0. Therefore, it is necessary to go back to the earlier checkpoint CP_0 and update all intervening checkpoints. Therefore, the first checkpoint 1010 is updated with the Cloud_0 data to create an updated first checkpoint 1110 (labeled CP_0*). Similarly, the second checkpoint 1015 is updated with the Cloud_0 data to create an updated second checkpoint 1115 (labeled CP_1*). Finally, the Cloud_0 data is used to create an updated current state 1130 and the previous current state 1030 is discarded.

Figure 12:
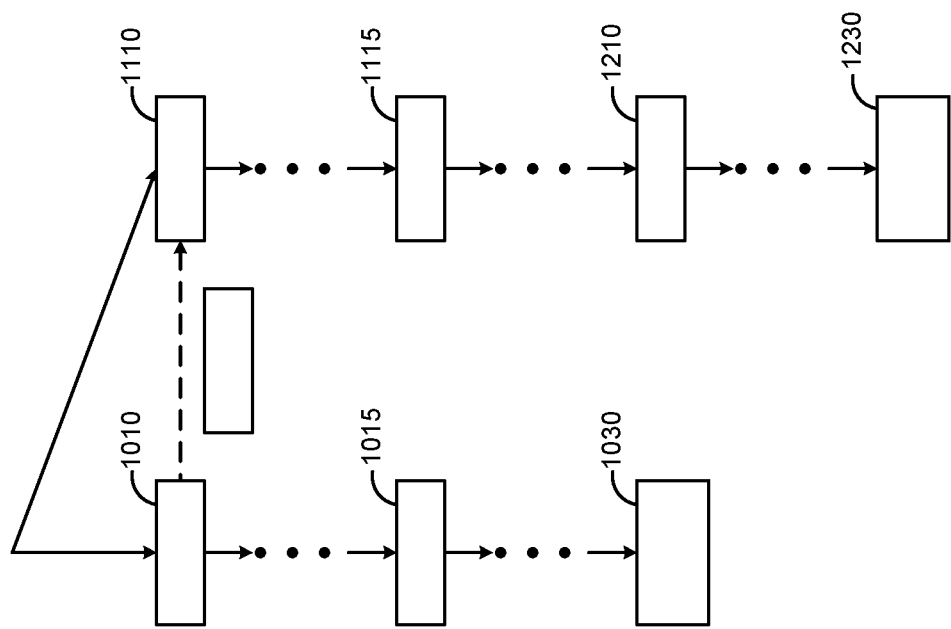
FIG. 12 is a state diagram illustrating the operation of the exemplary latency masking system according to an embodiment of the present disclosure.

FIG. 12 is a state diagram illustrating the operation of local perception processing in the exemplary latency masking system according to an embodiment of the present disclosure. At time t2.0, a third image frame is perception processed locally in hybrid vehicle function module 420. The third image frame occurs after the Cloud_0 results have been received and used to update the CP_0* checkpoint and the CP_1* checkpoint. Therefore, there is no need to update those checkpoints. Instead, the locally perception processed third frame creates a third checkpoint 1210 (labeled CP_2 (Δs)). The Δs represents new state information associated with the third image frame. The checkpoint CP_2 now represents the current state 1230.

Figure 13:
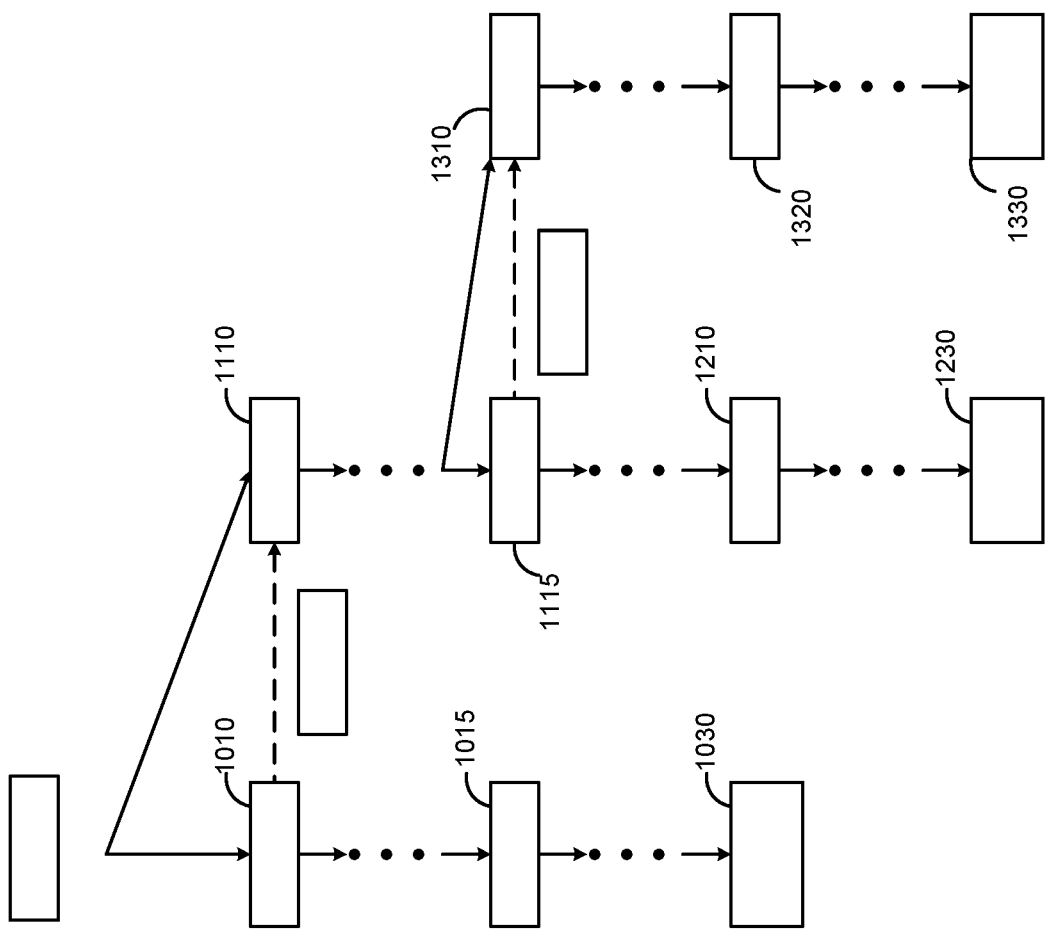
FIG. 13 is a state diagram illustrating the operation of the exemplary latency masking system according to an embodiment of the present disclosure.

FIG. 13 is a state diagram illustrating the operation of cloud results perception processing in the exemplary latency masking system according to an embodiment of the present disclosure. At time t2.5, second cloud results (Cloud_1) are received from the edge server 21. However, due to latency delays, the Cloud_1 results correspond to the second image frame that was received at time t1.0. Therefore, it is necessary to go back to the updated second checkpoint 1115 (i.e., CP_1*) and update all intervening checkpoints. Therefore, the second updated checkpoint 1115 is updated a second time with the Cloud_1 data to create a twice updated second checkpoint 1310 (labeled CP_1). Similarly, the third checkpoint 1210 is updated with the Cloud_1 data to create an updated third checkpoint 1320** (labeled CP_2*). Finally, the Cloud_1 data is used to create an updated current state 1330 and the previous current state 1230 is discarded.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A latency masking system configured for use in an autonomous vehicle (AV) system, the latency masking system comprising:
 a sensors module configured to provide sensor data from a plurality of sensors in the AV system, the sensor data including image frames provided by at least one vehicle camera and vehicle motion data;
 a wireless transceiver module configured to transmit the sensor data to a remote server associated with a network infrastructure and to receive from the remote server remote state information derived from the sensor data;
 an on-board function module configured to receive the sensor data from the sensors module and to generate therefrom local state information;
 a state fusion and prediction module configured to receive the remote state information and the local state information and to update the local state information with the remote state information; and
 a state history data structure associated with the state fusion and prediction module, wherein the state fusion and prediction module uses checkpoints in the state history data structure to update the local state information with the remote state information.

2. The latency masking system of claim 1, wherein the remote server is an edge server located proximate a wireless access point of the network infrastructure with which the wireless transceiver module communicates.

3. The latency masking system of claim 1, wherein the remote server is a cloud server accessed through an IP network by a wireless access point of the network infrastructure with which the wireless transceiver module communicates.

4. The latency masking system of claim 1, wherein the state fusion and prediction module uses a first checkpoint in the state history data structure to identify earlier-processed local state information associated with the first checkpoint that corresponds to later-received remote state information.

5. The latency masking system of claim 4, wherein the state fusion and prediction module updates the earlier-processed local state information with the later-received remote state information to compensate for latency associated with transmitting the sensor data to the remote server and receiving the remote state information derived from the sensor data.

6. The latency masking system of claim 5, wherein the state fusion and prediction module is further configured to update second earlier-processed local state information associated with a second checkpoint with the later-received remote state information.

7. The latency masking system of claim 5, wherein the on-board function module is further configured to create the first checkpoint by storing in the state history data structure first state data associated with a first image frame and a first time tag associated with the first image frame.

8. The latency masking system of claim 7, wherein the state fusion and prediction module uses a second time tag associated with the later-received remote state information to associate the first state data with the later-received remote state information.

9. The latency masking system of claim 1, wherein the AV system uses the updated local state information to perform path planning and vehicle control.

10. A method for compensating for latency in an autonomous vehicle (AV) system comprising:
providing in a sensors module sensor data from a plurality of sensors in the AV system, the sensor data including image frames provided by at least one vehicle camera and vehicle motion data;
transmitting the sensor data to a remote server associated with a network infrastructure;
receiving from the remote server remote state information derived from the sensor data;
receiving in an on-board function module the sensor data from the sensors module and generating therefrom local state information; and
receiving in a state fusion and prediction module the remote station information and the local state information and updating the local state information with the remote state information.

11. The method of claim 10, wherein a state history data structure is associated with the state fusion and prediction module.

12. The method of claim 11, wherein updating the local state information with the remote state information comprises using checkpoints in the state history data structure to update the local state information with the remote state information.

13. The method of claim 10, wherein the remote server is an edge server located proximate a wireless access point of the network infrastructure with which the AV system communicates.

14. The method of claim 10, wherein the remote server is a cloud server accessed through an IP network by a wireless access point of the network infrastructure with which the AV system communicates.

15. The method of claim 12, further comprising using a first checkpoint in the state history data structure to identify earlier-processed local state information associated with the first checkpoint that corresponds to later-received remote state information.

16. The method of claim 15, wherein updating the earlier-processed local state information with the later-received remote state information compensates for latency associated with transmitting the sensor data to the remote server and receiving the remote state information derived from the sensor data.

17. The method of claim 16, further comprising updating second earlier-processed local state information associated with a second checkpoint with the later-received remote state information.

18. The method of claim 16, further comprising creating the first checkpoint by storing in the state history data structure first state data associated with a first image frame and a first time tag associated with the first image frame.

19. The method of claim 18, further comprising:
using a second time tag associated with the later-received remote state information to associate the first state data with the later-received remote state information and conduct corresponding processing between both states.

20. The method of claim 10, further comprising the updated local state information to perform path planning and vehicle control in the AV system.

* * * * *